Feb. 20, 1940.                P. L. FOGLE                 2,190,779
                            GRADE LINE FINDER
                          Filed May 26, 1939           2 Sheets-Sheet 1

Inventor
Pearl L. Fogle
By
Attorneys

Feb. 20, 1940.   P. L. FOGLE   2,190,779
GRADE LINE FINDER
Filed May 26, 1939   2 Sheets-Sheet 2
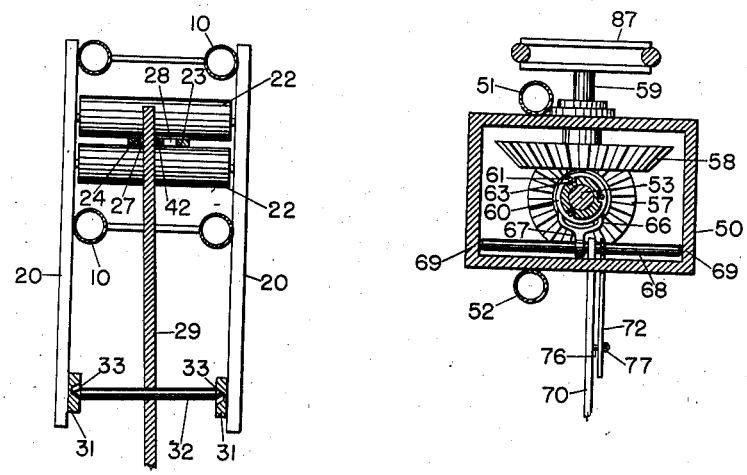
FIG. 3
FIG. 5
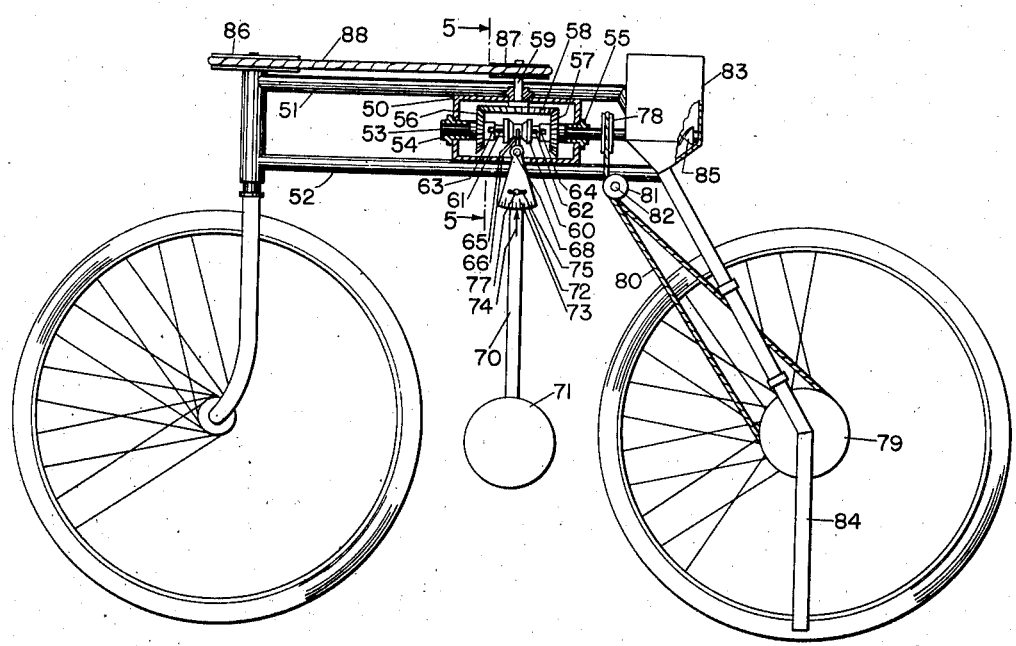
FIG. 4
Inventor
Pearl L. Fogle
By
Attorneys Patented Feb. 20, 1940

2,190,779

UNITED STATES PATENT OFFICE 2,190,779

GRADE LINE FINDER

Pearl L. Fogle, Dayton, Ohio

Application May 26, 1939, Serial No. 276,029

3 Claims. (Cl. 33—1)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to the art of establishing or tracing lines out on constant elevations, known as contour lines, as well as lines of a constant inclination or declination known as grade lines.

The problem of providing a cheap and inexpensive device for tracing out contour lines has become a problem of the first importance in view of the growing practice in farming to plow and otherwise treat cultivatable lands with reference to contour lines. The means for laying out such lines heretofore known involved expensive labor and apparatus, and in addition thereto no satisfactory means were known by which a vehicle could be automatically steered in tracing out a contour line without the intervention of the operator. Some means, while providing means for indicating changes in declination, require the operator to keep a constant check on an indicator and to steer the vehicle in accordance with the changes noted and his judgment of the land immediately ahead of the vehicle. In the present invention there is provided a simple and inexpensive mechanical device which can be operated by a single person, which automatically traces out a path of predetermined gradient and has facilities for marking its path of travel to indicate the desired line.

This invention, however, is not restricted to use in farming but is applicable in any situation where it is necessary to determine or retrace contour lines such as in establishing drainage systems, irrigation systems, mapping or surveying, and so forth.

The following description considered together with the accompanying drawings will disclose this invention more fully, its constructions, arrangements, combinations, and operations of parts and various objects and advantages thereof will be apparent.

In the drawings:

Figure 3 is a section along the line 3—3 of Figure 1.

Figure 4 is a side elevational view of another, and the preferred, embodiment of my invention, partly in section.

Figure 5 is a section along the line 5—5 of Figure 4.

Figure 2:
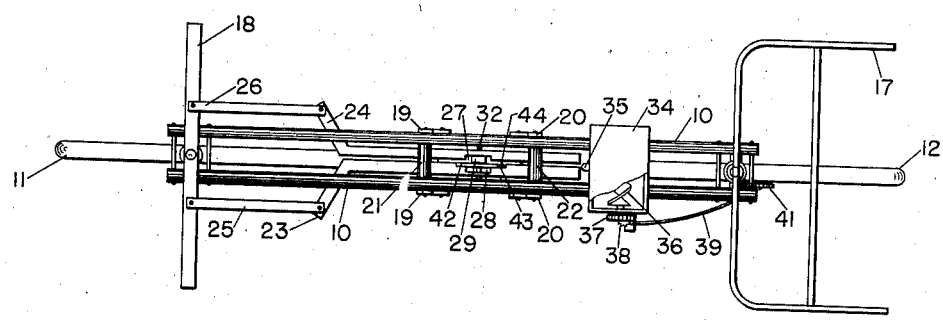
Figure 2 is a plan view of Figure 1.
Figure 1:
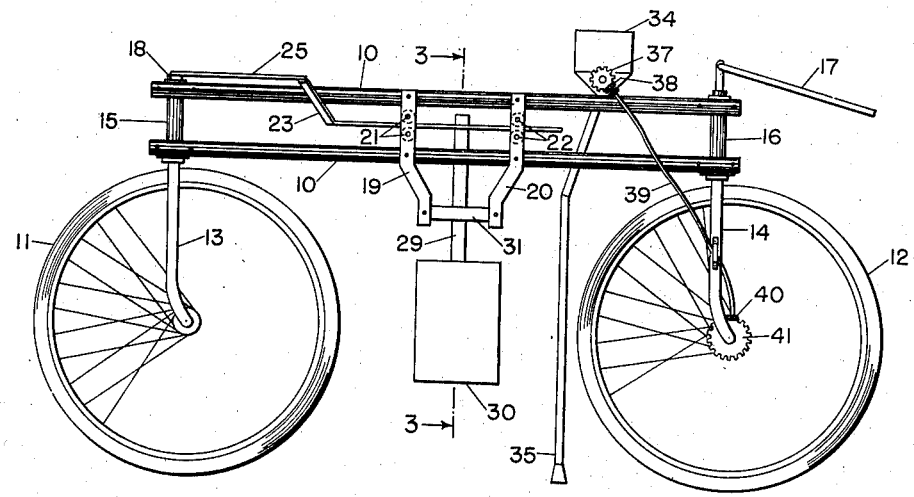
Figure 1 is a side elevational view of this invention in one of its forms.

Referring with more particularity to Figures 1, 2 and 3 of the drawings, the numeral 10 designates horizontal frame members of a bicyclic vehicle having a front wheel 11 and a rear wheel 12, each mounted on fork shafts 13 and 14, respectively, said shafts being rotatably mounted in suitable crown bearings 15 and 16, respectively, of the frame 10. The rear fork shaft 14 extends through its bearing 16 and is provided with handle bars 17. The front fork shaft 13 also extends upwardly through its crown bearing 15 and is provided with a steering bar 18 secured to it perpendicular to the plane of the wheel 11. Secured to the horizontal frame members 10 are two lateral pairs of vertical frame members 19, 19, and 20, 20 between the two ends of the vehicle, substantially as shown. Between each lateral pair of these vertical frame members 19, 19, a pair of rollers 21, 21, and 22, 22, respectively, is rotatably mounted in vertical alignment, with sufficient space between each pair to permit the entrance and free movement of drag links 23 and 24. The drag links 23 and 24 are parallel and extend toward the front of the vehicle, being bent upward and outwardly from the center in opposite directions, substantially as shown, terminating in horizontal alignment with the steering bar 18. The drag link 23 is connected to one end of the bar 18 by means of a link 25, pin-connected at each end. A similar link 26 connects the drag link 24 to the other end of the bar 18 and in the same manner. An open slot 27 is provided in the drag link 24 at a point normally midway between the rollers 21, 21, and 22, 22. A similar open slot 28 is provided in the drag link 23 opposite the slot 27. The two slots together form a rectangular aperture through which a vertical lever 29 is disposed. The lever 29 extends downward, at the end of which is attached a pendulum weight 30. A pair of cross bars 31, 31 are longitudinally secured to the vertical frame members 19, 19, and 20, 20 straddling the vertical lever 29. Said cross bars 31, 31 act as pivotal support for the lever 29, the lever 29 itself being secured to a shaft 32 rotatably mounted in pivot point bearings 33, 33 in said cross bar members 31, 31. A hopper 34 is attached to the frame of the vehicle, substantially as shown, and is connected to a vertical discharge tube 35 terminating at a point slightly above the ground lines of the vehicle. An agitator 36 is rotatably mounted in the throat of the hopper, the shaft thereof extending through one side to receive a gear 37 engaged with another gear 38 which is rotatably actuatable through a cable connection 39 by a gear wheel 40, meshing with a gear 41 concentrically secured about the hub of the wheel 12. On the inner edge of the drag link 23, one end of a bar 42 is pivoted to one side of the slot 28 and is adapted to bridge the slots 27 and 28. A hook 43 is provided on the other end of the bar 42 to engage with a stud 44 to hold the bar 42 in a horizontal position across said slots. By these means the vertical lever 29 can be made to engage either with the drag link 23 or 24, which engagement is accomplished by lifting the bar 42, shifting the lever 29 either to the right or to the left into one of the open slots 27 and 28, as the case may be, and returning the member 42 to its original horizontal position, engaging the stud 44.

The operation of the above-described embodiment of this invention is as follows: The vertical link is placed in engagement with either the drag link 23 or 24 depending upon the slope of the land to be traversed. That is, if the vehicle is to operate on a left-hand upward slope, the lever 29 is engaged with the left-hand drag link. If the slope is upwardly to the right, the lever 29 should be engaged with the right-hand drag link 24. The operator places the vehicle at the desired elevation on the slope, takes hold of the handle bars 17, and keeping the vehicle in a vertical position pushes it forward taking care that the rear wheel 12 follows in the tracks of the front wheel 11. As the vehicle moves along the ground, any difference in elevation between the front and rear wheels will cause a corresponding change in the angle between the lever 29 and the cross bars 33, 31. This angular difference has the effect of throwing the upper part of the lever 29 either forward or rearward, which in turn actuates the drag link 23 or 24 as the case may be, directing the vehicle to the right or to the left. If the vehicle is on a left-hand upward slope and the elevation of the front part of the vehicle becomes less than that of the rear wheel, the pendulum weight 30 is relatively thrown forward by virtue of which the lever 29 forces the link 24 rearward, thus turning the front wheel 11 to the right, which would be in an upward direction, thus raising the wheel 11 to the same elevation as the wheel 12. Conversely, if the wheel 11 assumes an elevation higher than the wheel 12, the weight 30 is thrown backward relatively, thereby urging the drag link 24 forward, turning the wheel 11 to the left and downward until it assumes the same elevation as the wheel 12. When the vehicle is operating on a left-hand upward slope with the lever 29 engaged with the drag link 23, the same effect is accomplished. Consequently, both wheels of the vehicle being first set at a desired elevation, the vehicle will automatically maintain substantially that elevation as long as the operator guides the rear wheel 12 in the track made by the front wheel 11. The hopper 34 is filled with a material, such as lime, for marking and as the vehicle moves forward the agitator 36 is actuated by a connection from the wheel 12 and deposits a visible ribbon on the ground to mark the line traced out.

In my preferred embodiment, shown in Figures 4 and 5, the principle of operation is substantially the same, only modified means are employed to automatically change the direction of the vehicle. A gear box 50 is mounted between the parallel frame members 51 and 52, through which a shaft 53 is rotatably mounted in a longitudinal direction in suitable bearings 54 and 55. The bearings 54 and 55 are in turn rotatably mounted through the opposite ends of the gear box 50, substantially as shown, to which are attached bevel gears 56 and 57. These bevel gears are maintained in constant mesh with a large bevel gear 58 fixed to a vertical shaft 59. Between the bevel gears 56 and 57, a clutch in the form of a coaxially slidable sleeve 60 is mounted for rotation with the shaft 53. At the opposite ends of said sleeve 60, a plurality of spaced pins 61 and 62, preferably three on each end, are coaxially disposed and are adapted to register with corresponding apertures 63 and 64, respectively, in the vertical face of the bevel gears 56 and 57. The pins 61 and 62 are just long enough so that when the sleeve 60 is in a position exactly midway between the two bevel gears 56 and 57, the pins do not engage with the apertures of either of said bevel gears, but a slight displacement of the sleeve 60 either forward or rearward would automatically cause an engagement with either one or the other of the bevel gears 56 and 57, as the case may be. Between the ends of the sleeve 60, an annular recess or groove 65 is provided and is slidably engaged with a semicircular jaw 66. This member 66 is pivoted to the upper end of a short normally vertical arm 67. The lower end of said arm 67 is fixed to a cross shaft 68, which shaft is rotatably mounted in pivot bearings 69, 69 on opposite sides of the gear box 50. A pendulum arm 70 is pivoted to said shaft 68 and depends therebelow between the wheels of the vehicle, to which is attached a weight 71. A bracket member 72 is fixed to the shaft 68 and terminates a short distance therebelow, the bottom end being fanned out to form an arc upon which a grade scale 73 is inscribed. A reference mark 74 is inscribed on the pendulum arm 70. An arcuated slot 75 is provided in the member 72 in slidable engagement with a horizontal threaded stud 76 fixed to the pendulum arm 70. A clamping thumb nut 77 is in threaded engagement with the stud 76 to permit clamping of the member 72 to the pendulum arm 70 in any selected position within the limits of the slot 75. A pulley 78 is fixed to the shaft 53 exterior to the gear box 50 and is connected to another pulley 79, fixed concentrically to the rear wheel of the vehicle, by means of an endless strained belt 80. Idler pulleys 81, 81 are rotatably mounted on a horizontal cross shaft 82, said shaft being bracketed to the frame of the vehicle. Said pulleys 81, 81 guide the belt 80 for optimum engagement with the pulley 78. In this manner power is delivered from the rear wheel of the vehicle to the shaft 53. A hopper 83, similar to that employed in the embodiment first above described, is also secured to the vehicle, substantially as shown, to the bottom of which is attached a discharge pipe 84. An agitator 85 is also mounted in the throat of the hopper and is actuated by power from the shaft 53, substantially as shown.

The front wheel of the vehicle is pivoted in a manner similar to that in the embodiment first above described, except that the steering bar 18 is replaced by a pulley 86. The shaft 59 extends upward, to which is fixed a pulley 87. This pulley 87 and the pulley 86 are geared by means of a strained endless belt 88. This belt 88 is preferably of a yieldable type so that it may be used either crossed or opened.

The operation of this modified form is similar to the embodiment first described, but has an additional feature in that it is capable of being utilized to lay out lines of constant inclination or declination other than zero. The device is first adjusted for the declination or inclination desired by loosening the nut 77 and shifting the pendulum about its pivot so that the reference mark 74 is opposite the point on the scale indicating the desired declination or inclination. The center of the scale indicates a zero inclination for a line of constant elevation. The forward portion of the scale designates degrees of inclination while the rearward portion of the scale designates degrees of declination. A differential change in elevation between the front part of the vehicle and the rear part effects a relative movement of the pendulum weight 71 and arm 70 with respect to the frame of the vehicle by virtue of which the short arm 67, to which the semicircular jaw 66 is fixed, actuates the sleeve 60 either forward or rearward, as the case may be, to engage selectively one of the gears 56 and 57. The bevel gear 58 is consequently rotated either to the right or to the left depending upon which of the bevel gears 56 and 57 is engaged with the sleeve member 60, and, in turn, rotates the shaft 59 and pulley 87. From this pulley 87 the motion is transmitted through the belt 88 to the pulley 86 thereby turning the front wheel of the vehicle either to the right or to the left. When the vehicle is operating on a right-hand upward slope the belt 88 should be open. If the vehicle is operating on a left-hand upward slope, the belt should be crossed.

Having thus described my invention, I claim:

1. A device of the character described comprising a bicyclic vehicle, a pendulum suspended by an arm pivoted to the frame of said vehicle, said pivoted arm extending upward a short distance from its pivot, horizontal drag links independently mounted between rollers on the frame of said vehicle, an open slot in each of said drag links for selective engagement with the extended portion of said pendulum arm, and guiding means on said vehicle responsive to each of said drag links independently.

2. A device of the character described comprising a bicyclic vehicle, a pendulum suspended by an arm pivoted to the frame of said vehicle, said pivoted arm extending upward a short distance from its pivot, a horizontal shaft rotatably mounted above said extended arm, a vertical shaft mounted above said horizontal shaft, a pulley fixed to the upper end of said vertical shaft, a bevel gear fixed to the lower end of said vertical shaft, bevel gears rotatably mounted on said horizontal shaft in constant mesh with said first-mentioned bevel gear and on opposite sides thereof, a sleeve mounted for rotation with said horizontal shaft slidable between said bevel gears on said horizontal shaft, means for selectively engaging said sleeve member with either of said last-mentioned bevel gears, an annular recess around said sleeve member between its ends, a semicircular jaw slidably engaged in the bottom of said recess, said jaw member being pivoted to the extended arm of said pendulum, means for constantly rotating said horizontal shaft when the vehicle is in motion, and means connected to said pulley for turning the guiding wheel of said vehicle.

3. A device of the character defined by claim 1, having means for adjusting the mechanism thereof to guide the vehicle along a selected inclination or declination.

PEARL L. FOGLE.